US009288714B2

(12) United States Patent
Lucky (10) Patent No.: US 9,288,714 B2
(45) Date of Patent: Mar. 15, 2016

(54) SYSTEM AND METHOD FOR DATA SIZE ADAPTATION IN A UE

(75) Inventor: Kundan Kumar Lucky, Bangalore (IN)

(73) Assignee: Samsung Electronics Co., Ltd (KR)

( * ) Notice: Subject to any disclaimer, the term of this patent is extended or adjusted under 35 U.S.C. 154(b) by 1513 days.

(21) Appl. No.: 12/433,378

(22) Filed: Apr. 30, 2009

(65) Prior Publication Data

US 2009/0274171 A1 Nov. 5, 2009

(30) Foreign Application Priority Data

Apr. 30, 2008 (IN) .......................... 1065/CHE/2008

(51) Int. Cl.
| | |
|---|---|
| H04W 28/06 | (2009.01) |
| H04L 12/801 | (2013.01) |
| H04L 12/805 | (2013.01) |
| H04W 80/02 | (2009.01) |

(52) U.S. Cl.
CPC ............... *H04W 28/06* (2013.01); *H04L 47/14* (2013.01); *H04L 47/36* (2013.01); *H04W 80/02* (2013.01)

(58) Field of Classification Search
None
See application file for complete search history.

(56) References Cited

U.S. PATENT DOCUMENTS

| | | | |
|---|---|---|---|
| 7,190,701 B2 | 3/2007 | Yi et al. | |
| 7,215,655 B2 * | 5/2007 | Zhang et al. | 370/320 |
| 7,522,557 B2 * | 4/2009 | Zhang et al. | 370/329 |
| 7,596,117 B2 * | 9/2009 | Iacono et al. | 370/329 |
| 7,647,541 B2 * | 1/2010 | Terry et al. | 714/749 |
| 7,710,911 B2 * | 5/2010 | Terry | 370/328 |
| 7,885,245 B2 * | 2/2011 | Terry | 370/342 |
| 2002/0021714 A1 | 2/2002 | Seguin | |
| 2004/0008659 A1 | 1/2004 | Kim | |
| 2005/0136919 A1 | 6/2005 | Park et al. | |
| 2005/0169293 A1 * | 8/2005 | Zhang et al. | 370/437 |
| 2006/0013268 A1 * | 1/2006 | Terry | 370/537 |
| 2006/0140158 A1 * | 6/2006 | Terry | 370/335 |
| 2006/0209896 A1 * | 9/2006 | Choi et al. | 370/469 |

(Continued)

FOREIGN PATENT DOCUMENTS

| | | |
|---|---|---|
| CN | 1 291 029 | 4/2001 |
| EP | 1 073 251 | 1/2001 |

(Continued)

OTHER PUBLICATIONS

Huawei, "RLC PDU Size Selection for Improved L2", R2-082540, 3GPP TSG-RAN WG2 #62, May 9, 2008.

(Continued)

*Primary Examiner* — Donald Mills
(74) *Attorney, Agent, or Firm* — The Farrell Law Firm, P.C.

(57) ABSTRACT

A method is described for adapting the size of data for a future Transmission Time Interval (TTI) by a User Equipment (UE), wherein all the Media Access Control (MAC)-d flows are grouped and stored in different lists based on a type of grants associated with the MAC-d flows, ability of a MAC-d flow to be multiplexed with another MAC-d flow from a list, and data availability in a logical channel mapped onto a MAC-d flow in the current TTI. The E-TFC is then selected by the UE for the future TTI using the MAC-d flow having the highest power offset in a consolidated list including the grouped MAC-d flows. The size of the data is thereby adapted using the selected E-TFC. Further disclosed is a method for generating RLC PDUs by the UE for the future TTI using the variation in the scheduled grant for the UE and the size of the data adapted for the future TTI.

7 Claims, 6 Drawing Sheets

(56) References Cited

U.S. PATENT DOCUMENTS

| | | | |
|---|---|---|---|
| 2007/0047451 A1* | 3/2007 | Lohr et al. | 370/242 |
| 2008/0069035 A1* | 3/2008 | Pinheiro et al. | 370/328 |
| 2008/0225893 A1 | 9/2008 | Cave et al. | |
| 2009/0086709 A1 | 4/2009 | Pani et al. | |
| 2009/0103511 A1 | 4/2009 | Marinier et al. | |
| 2009/0258666 A1* | 10/2009 | Pelletier et al. | 455/522 |

FOREIGN PATENT DOCUMENTS

| | | |
|---|---|---|
| GB | 2 401 760 | 11/2004 |
| KR | 1020020042332 | 6/2002 |
| RU | 2 305 899 | 9/2007 |
| WO | WO 2008/005503 | 1/2008 |
| WO | WO 2009/045882 | 4/2009 |

OTHER PUBLICATIONS

InterDigital, "Considerations on RLC PDC Size Selection", Tdoc R2-080435, 3GPP TSG-RAN WG#60bis, Jan. 14-18, 2008.
Ericsson et al., "RLC PDU Size Adaptation", R2-081525, 3GPP TSG-RAN2 Meeting #61bis, Mar. 31-Apr. 4, 2008.
Qualcomm Europe, "RLC PDU Size Selection for Improved L2" R2-081876, 3GPP TSG-RAN WG2 #61-bis, Mar. 31-Apr. 4, 2008.
InterDigital, "RLC PDU Size Selection", R2-082513, 3GPP TSG-RAN WG2#62, May 5-9, 2008.
Japanese Office Action dated Feb. 9, 2015 issued in counterpart application No. 2013-192730.

* cited by examiner

SYSTEM AND METHOD FOR DATA SIZE ADAPTATION IN A UE

PRIORITY

This application claims priority to an application entitled "System And Method For Data Size Adaptation In A UE" filed in the Indian Patent Office on Apr. 30, 2008 and assigned Serial No. 1065/CHE/2008, the contents of which are incorporated herein by reference.

BACKGROUND OF THE INVENTION

1. Field of the Invention

The present invention relates generally to a User Equipment (UE), and in particular, to adaptation of data unit size in a UE.

2. Description of the Related Art

The present invention relates to the Third Generation Partnership Project (3GPP) Specifications for Layer 2 Protocols. The latest 3GPP Release-8 versions 8.5.0, of 25.321 Media Access Control (MAC) and 8.4.0 of 25.322 Radio Link Control (RLC) are referred to in context of the explanation of various protocols and state of the art herein.

A communication device such as a UE includes multiple protocol layers or stacks. The data link layer or layer 2 (L2), is layer responsible for such tasks as handling errors in the physical layer (or L1), flow control, and frame synchronization. The functions of L2 are shared by two sub layers of L2, known as the MAC sub layer and the RLC sub layer. The MAC sub layer controls the access to the network by granting permission to the communicating entities to transmit the data and the RLC sub layer controls the data frame synchronization, flow control, and error checking.

The service provided by the RLC is called Radio Bearer (RB). MAC is connected to L1 via a transport channel and to RLC via a logical channel. Release 6 of 3GPP introduced the Enhanced Dedicated CHannel (E-DCH) in the UpLink (UL). In conventional systems, the E-DCH is configured with specific E-DCH Transport Format Combinations (E-TFCs). E-TFCs are the data rate combinations that are controlled by a UE in High Speed Uplink Packet Access (HSUPA) and are used by the UE. The data rate for an E-DCH is selected using a procedure called the E-TFC selection to transmit data from the logical channel. Every logical channel is associated with some absolute priority and transmission of higher priority data is maximized.

The size of an RLC PDU, that is to be transmitted by a UE in either a current Transmission Time Interval (TTI) or in a future TTI, is adapted according to the current radio conditions of the UE. Most of the commonly known schemes for RLC PDU size adaptation are either E-TFC based or Grant based. In the E-TFC based schemes, the E-TFC selected in the current TTI is considered as the guiding metric for determining the PDU size in the next or future TTI. Accordingly, if an RB has little or no data to transmit in the current TTI, then little or no data would be taken from it for transmission in a future TTI. Thus, the data size from this RB would be minimal or zero. However, the amount of data for an RB in the current TTI may not remain the same for a future TTI. In a future TTI, when this RB has data available for transmission, the existing E-TFC based schemes would incorrectly result into a zero (or a smaller size) data transmission due to its reliance on the selected E-TFC. This is an incorrect estimation resulting in an incorrect adaptation of the data size.

The Grant based schemes consider the grant received in the current TTI as the guiding metric for the data size estimation for a future TTI. However, the data size for an RB cannot be directly derived from the grant and is affected by presence of data on higher priority RBs, buffer occupancy of the higher priority RB when the higher priority RB is using a scheduled grant, and applicability for or restriction to a TTI of the relevant non-scheduled grant, when the higher priority RB is using a non-scheduled grant.

All of these may lead to an incorrect estimation of the data size for a future TTI and subsequently, result in an incorrect adaptation of the data size for a future TTI. Further, the existing schemes also fail to regulate the number of RLC PDUs that could be created prior to the actual transmission. One of the commonly known approaches is to specify an arbitrary limit on the number of RLC PDUs that can be created, which either causes too many or too few RLC PDUs to be created. When the grant increases and an insufficient number of PDUs are created, then it is possible that the grants would not be properly used, resulting in a waste of scarce radio resources. However, if the grant decreases and too many PDUs are created using this approach, then the PDUs would have to be segmented into many parts across TTIs, resulting in an increased probability of loss and header overheads. Thus, there is a need to provide a solution to estimate the size of the RLC data with improved correctness that may be adapted by a UE for transmitting the data in the next or a future TTI.

Further, as per the conventional methods, a constant number of RLC PDUs are created in advance by the UE using the grant allowed in the current TTI. However, the scheduled grant for the UE may decrease over a period of time, which would eventually allow less data to be transmitted in the future TTIs. Therefore, all the RLC PDUs generated in the intermediate TTIs may not be transmitted by the UE and could remain in the buffer as the cumulative size of the generated RLC PDUs may be larger than the size allowed by a prevailing scheduled grant. Thus, there is a need to efficiently generate the RLC PDUs by a UE for the future TTI.

SUMMARY OF THE INVENTION

Accordingly, the present invention has been made to solve the above-mentioned problems occurring in the prior art, and the present invention provides an apparatus and method for adapting to a data size for a future TTI by a UE wherein all the MAC-d flows that are active for the future TTI are grouped into a number of lists based on the type of grants associated with the MAC-d flows. Thus, all MAC-d flows having non-scheduled grants that are expected to be active in the future TTI are stored in a first list and all MAC-d flows that are allowed by the network to be multiplexed with the MAC-d flows from the first list are also added to the first list. If the first list does not contain a MAC-d flow, then a second list is prepared with all MAC-d flows that do not have a non-scheduled grant and have at least an RLC-PDU in the current TTI. The first list is updated with the MAC-d flow that has the highest power offset in the second list. The E-TFC is then selected by the UE for the future TTI using the MAC-d flow having the highest power offset in the updated first list. The size of the data for the future TTI is thereby adapted by the UE using the selected E-TFC. The second list can be prepared either prior to or after the E-TFC for the future TTI is selected.

The present invention further provides a method of distributing the size of the data to a logical channel based on a value of grant associated with a MAC-d flow, wherein the logical channel is mapped onto the MAC-d flow from the updated first list, and the data size adapted by the UE. All the logical channels mapped onto the MAC-d flows from the updated first list are stored in a third list. A minimum of the value of the grant and the size of the data adapted by the UE is indicated by a first protocol layer in the UE to a second protocol layer in the UE when the grant is a non-scheduled grant. If the grant is a scheduled grant, then either the size of the data adapted by the UE or a difference value is indicated by the first protocol layer to the second protocol layer.

According to the present invention, a method for generating RLC PDUs for a future TTI by a UE is provided wherein a maximum value of number of bytes for generating the RLC PDUs for the future TTI is determined using a factor and a size of the RLC PDU adapted by the UE for the future TTI, wherein the UE is in a current TTI. The RLC PDUs for the future TTI are then generated using the maximum value. The factor is based on maximum variation of a scheduled grant for the UE.

According to the present invention, a communication device is provided that includes of a storing means for storing a number of MAC-d flows, which are stored in a number of lists based on the type of grants associated with the MAC-d flows. The communication device further includes a processing unit for selecting an E-TFC for a future TTI using a value of power offset associated with the MAC-d flow from the lists of stored MAC-d flows, and a processing unit for generating RLC PDUs for the future TTI using a factor based on maximum variation in grant for the communication device, and the size of the data adapted by the UE for the future TTI.

BRIEF DESCRIPTION OF THE DRAWINGS

The following description of the present invention would be apparent when taken in conjunction with the accompanying drawings, wherein.

DETAILED DESCRIPTION OF PREFERRED EMBODIMENTS

Hereinafter, preferred embodiments of the present invention will be described with reference to the accompanying drawings. In the following description and drawings, a detailed description of known functions and configurations incorporated herein will be omitted for the sake of clarity and conciseness.

A communicating entity or a network element in a legacy telecommunication system, such as a Universal Mobile Telecommunications System (UMTS) or a High Speed Packet Access (HSPA) or a HSPA+ system, consists of multiple protocol layers or stacks. An example of a communicating entity is a UE, which is considered in this description.

Figure 1A:
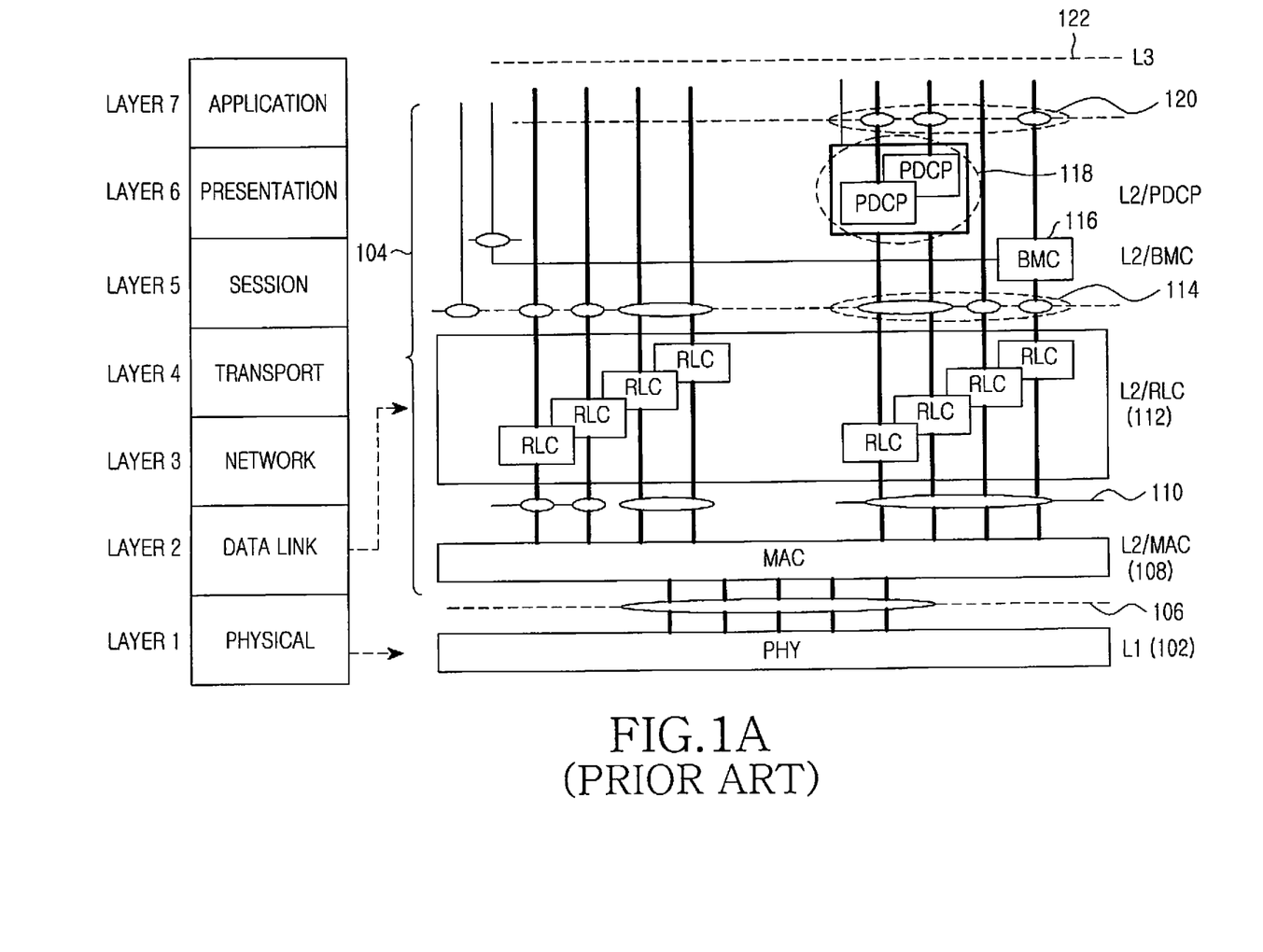
FIGS. 1A, 1B and 1C illustrate the functions and the services of the Layer 2 in a UE model based on the existing Open Systems Interconnection (OSI) Reference model.

FIG. 1A illustrates the functions and the services of the Layer 2 (or L2) in a UE based on the existing OSI Reference model. L2 104, also known as a Data link layer, is responsible for tasks such as handling errors in the physical layer (or L1) 102, flow control and frame synchronization. The functions of L2 104 are shared by the MAC 108 sub layer and the RLC 112 sub layer. The MAC 108 sub layer controls the access to the network by granting permission to a communicating entity, such as a UE, to transmit data and the RLC 112 sub layer controls data frame synchronization, flow control and error checking. The RLC 112 provides Radio Bearer (RB) 114 service. The MAC 108 is connected to L1 102 via transport channels 106 and to the RLC 112 via logical channels 110.

A protocol layer uses the services provided by the one immediately below it and, in turn, provides services to the one immediately above it. In UMTS systems for enhanced uplink with improvement for higher data rates (HSPA+), a new E-DCH was introduced by Release 6 of 3GPP. Transmission of data over the E-DCH is controlled by three MAC entities, which are MAC-d, MAC-i and MAC-is. The RLC receives data units, called RLC SDUs, from the upper layers or applications and segments and/or concatenates the SDUs to create new data units, called RLC PDUs.

MAC-d receives the RLC PDUs as MAC-d SDUs and transfers the MAC-d SDUs to MAC-is as MAC-d PDUs. MAC-is SDUs, or MAC-d PDUs, from different logical channels are multiplexed into a single MAC-is PDU. Multiple MAC-is PDUs from multiple logical channels, but only one MAC-i PDU, can be transmitted in a Transmission Time Interval (TTI). It is possible to map various types of application data to a single E-DCH transport channel. However, since the quality of service requirements of different applications could differ significantly, they are grouped into different profiles called MAC-d profiles. A MAC-d profile is uniquely associated with a MAC-d flow, which consists of one or more logical channels. A MAC-d profile essentially controls the latency and error rate for the application data mapped on to it.

Figure 1B:
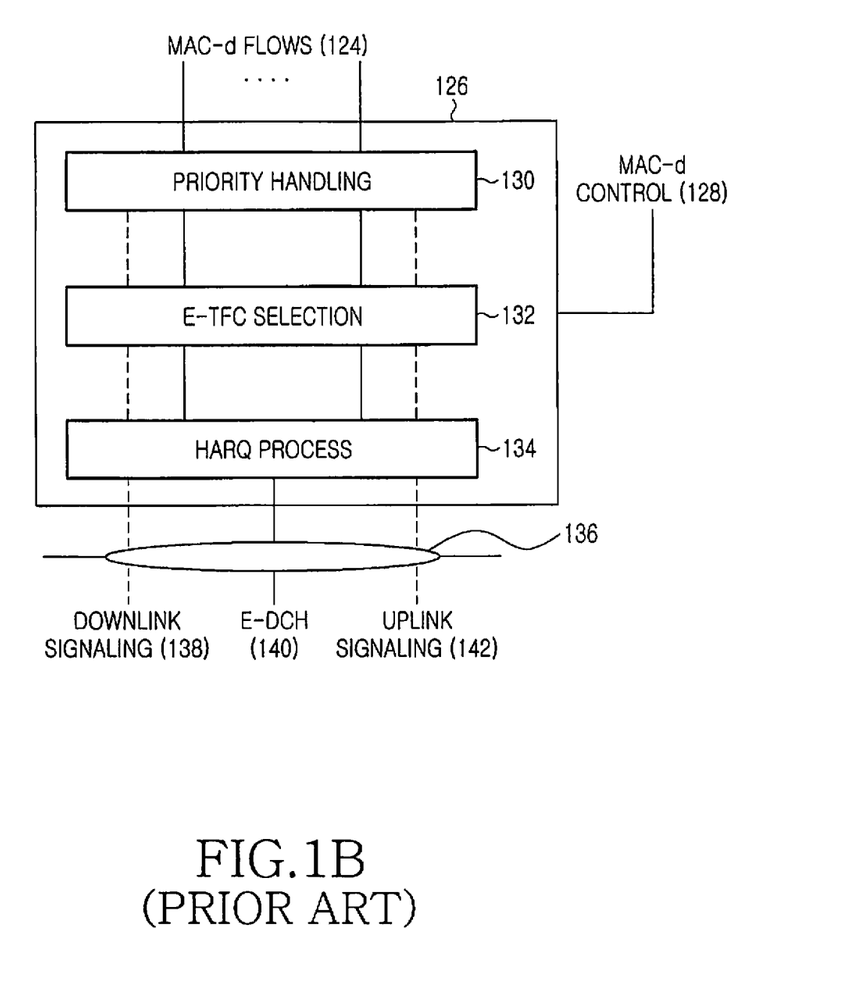

MAC-i 126 handles the E-DCH 140 transport channel, as is illustrated by FIG. 1B. Data transmission over the E-DCH 140 transport channel is controlled by a process known as Hybrid Automatic Repeat ReQuest (HARQ) 134 in the MAC-i 126. There could be 4 or 8 HARQ processes depending on whether the value of TTI is 10 ms or 2 ms respectively. The HARQ processes are time-aligned and uniquely identifiable. It is possible to restrict the logical channels from which data could be taken up for transmission in a certain TTI, in the following three ways:

For every MAC-d flow, it is possible to specify the list of MAC-d flows that could be multiplexed with it in the same TTI.

For every MAC-d flow with a non-scheduled grant, it is possible to specify the exclusive list of HARQ processes that can be used for transmitting data from it.

It is possible to specify the exclusive list of HARQ processes that can be used to transmit the data from the MAC-d flows that are transmitted using a scheduled grant.

In conventional systems, the E-DCH is configured with specific E-DCH Transport Format Combinations (E-TFCs), which are the data rate combinations that are allowed to be controlled by a UE in HSUPA and are used by the UE. As is illustrated by FIG. 1B, the data rate for an E-DCH 140 is selected using a procedure called the E-TFC selection 132 to transmit data from a logical channel. Every logical channel is associated with some absolute priority and these priorities are handled 130 to transmit the data. Transmission of higher priority data is maximized. The functional blocks [130, 132, 134] that are deemed relevant for an understanding of the present invention are only described here and various other functional blocks, as may be prescribed by the standard for the proper functioning of the MAC-i 126, are assumed to co-exist along with the functional blocks [130, 132, 134] enabling the MAC-i 126 to function normally.

Figure 1C:
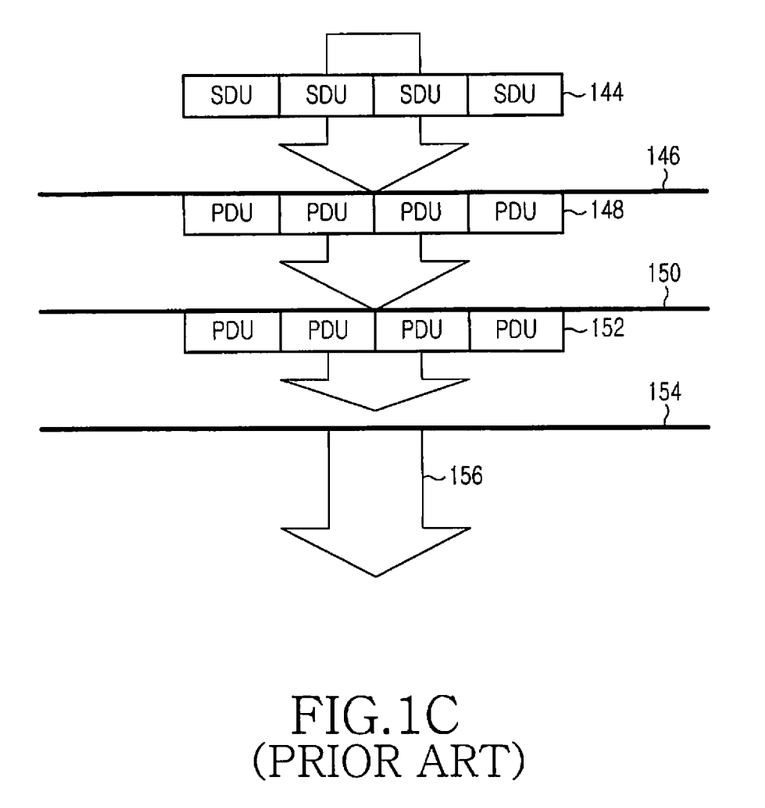

As is illustrated by FIG. 1C, the RLC 146 receives RLC SDUs 144 from an upper layer and segments and/or concatenates the SDUs 144 and makes another set of data units, called RLC PDUs 148. The RLC PDUs 148 are submitted to MAC 150, which in turn submits them to L1 154. L1 transfers 156 these PDUs to the L1 of the peer communicating entity.

Further, in the UMTS systems for the enhanced uplink, the transmission over the E-DCH is also controlled by allocating power that can be used for transmission. The power is allocated in terms of a power offset from the Dedicated Physical Control CHannel (DPCCH) which is power controlled by the network. The size of an RLC PDU must be less than or equal to an allowed maximum RLC PDU size. The size of an RLC PDU must be greater than or equal to an allowed minimum RLC PDU size if there is enough data in the buffer. E-TFC selection provides the power offset corresponding to an E-TFC necessary for a successful transmission of data. Instead of the allocation of power, the network can allocate constant bit-rates to certain applications. The data from these applications can be transmitted irrespective of the power allocated by the network in a current TTI. Such a constant bit-rate is called a Non-Scheduled Grant (NSG). The typical power allocation is called a Scheduled Grant (SG), which can be absolute or relative. The absolute grant is an absolute maximum value of the power offset that can be applied for a transmission. The relative grant could indicate either an UP, DOWN or HOLD.

For an RB mapped on to a MAC-d flow with a non-scheduled grant, the allowed data size does not change based on the radio conditions. Therefore, the requirement for data or PDU size adaptation for such an RB is not important. In the following description, the term "RB" is used for an RB that is mapped on to a MAC-d flow the scheduled grants.

Figure 2A:
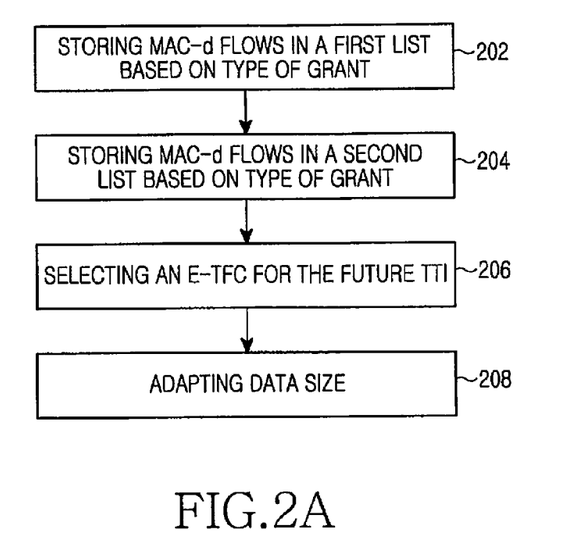
FIG. 2A illustrates a method of adapting the data size for a future TTI by a UE in accordance with the present invention.

FIG. 2A illustrates a method of adapting the data size for a 'current+N' or future TTI by a UE where N is a variable to indicate the number of TTI to be considered for future from the current TTI, according to the present invention. Logical channels, from which data could be used for transmission in a certain TTI, could be restricted based on grants associated with the logical channels. This information is used to determine whether the data from an RB is to be used in a future TTI.

In step 202, all the MAC-d flows with the non-scheduled grants that are allowed to use the HARQ process that will be active in the future TTI are determined and stored in a first list. The MAC-d flows or data multiplexed with the MAC-d flows already stored in the first list are determined, and are also stored along with the MAC-d flows in the first list. When the MAC-d flow, to which the RB maps, does not belong to one or more of the MAC-d flows stored in the first list, the data from this RB cannot be transmitted in the future TTI. Otherwise, the RB can be multiplexed in the future TTI. If it is determined that no data can be transmitted from this RB in the future TTI due to scheduled restrictions, the MAC indicates this to the RLC.

It is assumed that all the MAC-d flows with non-scheduled grants allowed in a certain TTI can also be multiplexed together in a TTI. If this is not true, then the MAC-d flows that can be multiplexed with the first determined MAC-d flows, have the highest priority logical channel among those present in the first list. After the first list containing the MAC-d flows (and hence the MAC-d profiles) is ready, the potentially applicable power offset for the future TTI can be determined as a MAC-d flow, that may consist of several logical channels. The MAD-d flow consists of power offset to be applied to the data and also the number of times the data could be transmitted if the peer communicating entity does not receive the transmitted data correctly.

The data availability in a logical channel in the current TTI is considered as a determining factor for the future TTI as there is no formidable existing method to predict the actual availability of data on the different logical channels (and hence the MAC-d flows). Also, as the value of N for a future TTI is expected to be quite small (most likely 1 or 2), it is expected that the data availability will not change significantly from the current TTI to the future TTI.

However, it is not possible to conclusively determine the data availability on different logical channels (and hence the MAC-d flows) for the future TTI. Therefore, if the first list does not contain any MAC-d flow then it is further determined whether any of the MAC-d flows do not have the non-scheduled grant but have some data, which could be a PDU, in the current TTI. These MAC-d flows are stored 204 in a second list, in step 204. Then the MAC-d flow having the highest power offset in the second list is determined.

The first list is updated with this MAC-d flow wherein the newly determined MAC-d flow from the second list is stored in the first list. The preparation of the second list that involves the verification of data availability in a logical channel that is mapped onto a MAC-d flow can also be performed after the E-TFC selection. However, this approach would not significantly change the final data size that is ultimately needed for adaptation to the UE for the future TTI.

After the potentially applicable power offset is determined for the future TTI, the potentially applicable E-TFC for the future TTI is selected in step 206 using the determined MAC-d flows stored in the recently updated first list. The MAC-d flow used for selecting the E-TFC is the one having the highest power offset among all the MAC-d flows stored in the updated first list. The E-TFC can be selected using the methods as specified in the 3GPP MAC specification of 25.321 and the 3GPP L1 specification of 25.213. The potential E-TFC applicable for the future TTI is determined using the value of scheduled grant as available in the current TTI. The scheduled grant in the current TTI is a determining factor for the future TTI as N being very small. Since absolute grants are generally infrequent it is expected that no new absolute grant(s) would be received in the future TTI. It is also expected that the change in the scheduled grant brought about in the future TTI with N TTIs due to the relative grant(s) would be relatively insignificant.

After the potentially applicable E-TFC has been selected in step 206 for the future TTI the data sizes applicable for the future TTI is retrieved using the methods as specified in the protocols. In step 208, the UE adapts to the retrieved data sizes for transmitting data. Thus the UE is able to efficiently adapt to the data size prior to its actual transmission.

Figure 2B:
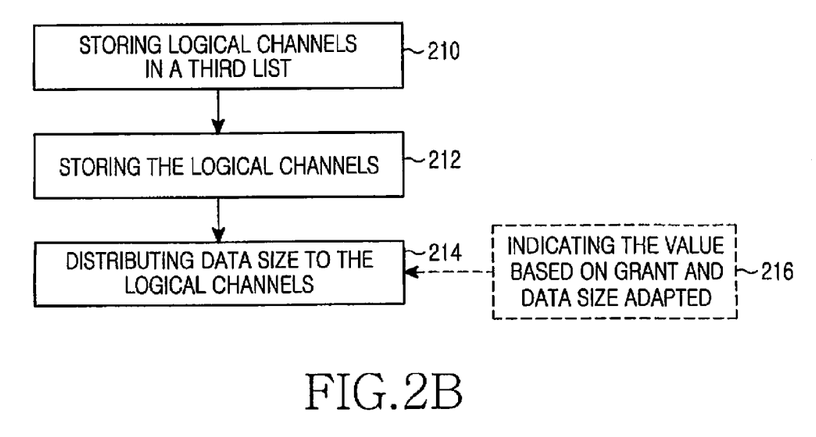
FIG. 2B illustrates a method of distributing the data size adapted by the UE for the future TTI to the logical channels mapped onto MAC-d flows.

FIG. 2B illustrates a method of distributing the data (RLC PDU) size adapted by the UE for the future TTI to the logical channels mapped onto the MAC-d flows, according to the present invention. A dummy distribution of the allowed bandwidth (adapted data size) is performed. If a logical channel maps onto a MAC-d flow from the updated first list then it is stored in a third list in step 210. All such logical channels are then stored in the third list and are sorted in step 212 based on their priority. They are preferably sorted in decreasing order of priority, and the adapted data size is distributed in step 214 among the logical channels stored in the third list based on values of grants associated with the MAC-d flows from the third list, and the data size adapted by the UE.

In step 216, the protocol layer in the UE that handles the MAC-d flows indicates to the RLC layer the required values.

If the logical channel maps onto a MAC-d flow with a non-scheduled grant, then the minimum of the non-scheduled grant and the size of the data adapted by the UE is indicated in step 216 to the RLC and the data size allocated to the logical channel equals this minimum value. If the logical channel maps onto a MAC-d flow without a non-scheduled grant, then either the size of the data adapted by the UE for the future TTI or a difference value is indicated in step 216 to the RLC. Thus, for the scheduled grant the RLC can either use the difference value or the data size adapted by the UE to distribute the data size to the logical channel.

The difference value is actually the size remaining (or available for transmission) in the data size adapted by the UE after a portion of the data size adapted by the UE is distributed among the logical channels having non-scheduled grants in the third list. The data size adapted by the UE is first distributed among logical channels having higher priorities. Thus, after each such distribution among the logical channels having higher priorities (logical channels having non-scheduled grants) the data size adapted by the UE is reduced by the size that is already distributed.

Figure 3:
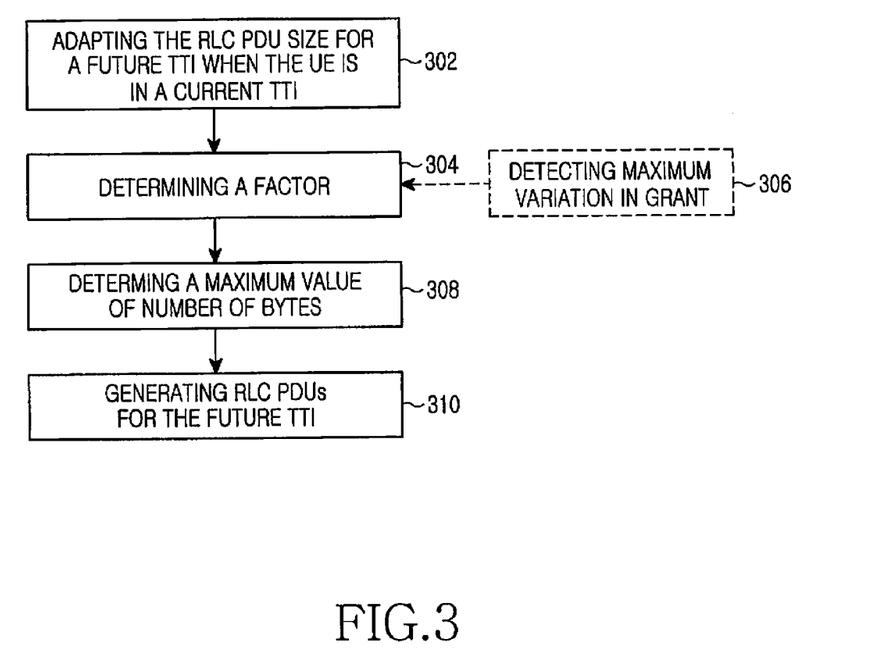
FIG. 3 illustrates a method of generating RLC PDUs by a UE for a future TTI.

FIG. 3 illustrates a method of generating RLC PDUs by a UE for a future TTI when the UE is in a current TTI, according to the present invention. The RLC PDUs to be generated are not limited by the number of PDUs as in prior art, but are generated based on number of bytes that could be buffered in created RLC PDUs. In step 302, the UE when in the current TTI adapts the data size for the future TTI. Let the RLC data size adapted for the future TTI be 'S' bytes.

A factor controlling the number of RLC PDUs to be generated is then determined in step 304 by the UE. As the grant varies with every TTI, the maximum variation in grant possible for the UE within a duration of 'N' TTIs, where 'N' is a variable deciding the number of future TTIs, is detected in step 306 by the UE. The factor is thus based on this maximum variation of grant for the future (or 'current+N') TTI and can be derived by a mathematical procedure applicable for this scenario. For example, assuming the factor as 'K' and the maximum variation in grant possible for the future TTI as 'm', the factor can be given by:

$$K = \lceil 10^{\hat{}}(m/10) \rceil$$

where '^' is exponentiation and '/' is the arithmetical function of division. The 'm' is considered in terms of decibel (or dB). The variation in scheduled grant is considered in the embodiments of the present invention.

Then the maximum number of bytes for generating the RLC PDUs is determined in step 308 by using the determined factor 'K' and the RLC PDU size 'S' adapted for the future TTI by the UE in the current TTI. The maximum number of bytes can be derived by a mathematical procedure applicable for the scenario using the RLC PDU size 'S' and the factor 'K'. A preferred procedure for this invention can be given by:

$$\max = S * K$$

where 'max' is the maximum number of bytes and '*' is the arithmetical function of multiplication. The RLC PDUs are then generated in step 310 by the UE using the 'max' bytes where the total size of the RLC PDUs to be generated should not exceed the 'max' bytes.

The preferred embodiments of the present invention are applicable in any of the telecommunication systems modeled after OSI Reference model. However, a TTI value of '2' ms with a delay of '2' (that is, N=2) has been considered in this description. These embodiments may be realized in various other methods using different values of TTI and delay, N.

The method of the present thus avoids the errors of the existing mechanisms that are exclusively based on either the grant or the selected E-TFC. It also avoids the possibility that data may not be allowed to be transmitted in a future TTI due to zero buffer occupancy in the current TTI. Overall, the gain is essentially achieved in terms of an improved adaptation of the data size resulting in efficient data transmission.

Other embodiments may be possible wherein the data size adaptation could be carried out by predicting the list of data stream that would be allowed in certain future TTI and then selectively considering the current state of the system to determine the possible data distribution in the future TTI.

Figure 4:
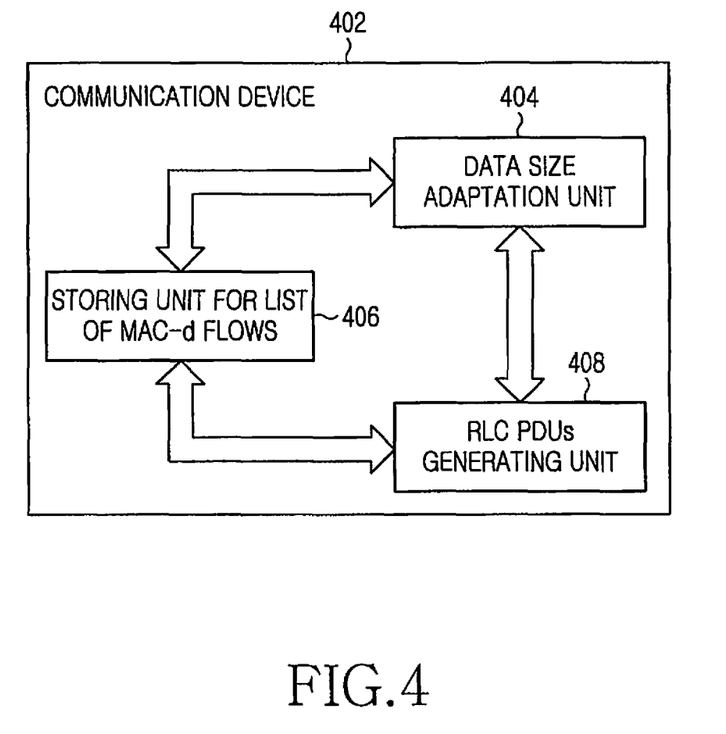
FIG. 4 illustrates a communication device including functional blocks in accordance with the present invention.

FIG. 4 illustrates a communication device including functional blocks in accordance with the present invention. The figure illustrates the functional blocks in a communication device 402 that are required for performing the methods of the present invention. The communication device 402 includes a storing unit 406 for storing MAC-d flows that are grouped into discrete lists stored in the storing unit 406. The storing unit 406 may include a memory unit, a stack or a buffer as may be available with the communication device 402. The MAC-d flows are stored in different lists based on the type of grants associated with the MAC-d flows and availability of RLC PDU in the MAC-d flows when the communication device 402 is in a current TTI.

The communication device 402 also includes a processing unit 404 for adapting data (or RLC PDU) size for a future TTI. The processing unit 404 thus can also be called a data size adaptation unit 404. This unit 404 selects an E-TFC for a future TTI when the communication device 402 is in the current TTI using value of power offset associated with the MAC-d flows in the stored lists. Thus the unit 404 uses the selected E-TFC to adapt the data size by the communication device 402 for the future TTI. This data size adaptation unit 404 enables the communication device 402 to estimate the RLC PDU size with improved correctness that may be transmitted by the communication device 402 in the future TTI. The communication device 402 also includes a processing unit 408 for generating the data for the future TTI using a factor, based on maximum variation in grant for the current TTI as may be available for the communication device 404, and the RLC PDU size adapted by the data size adaptation unit 404 of the communication device 402 for the future TTI. The processing unit 408 can also be called an RLC PDUs generating unit 408 in the communication device 402.

The communication device 402 as described here can be a UE capable of functioning in any of the well known legacy telecommunication systems. Thus, the various functional blocks can exist across various protocol layers in the UE as per the norms laid by the OSI Reference model. Various other functional blocks that may be necessary for the proper functioning of the communication device 402 are not described here. Such blocks are assumed to function normally in the manner required to enable the communication device 402 to function in a particular telecommunication system. The functions blocks [404, 406, 408] of the communication device 402 (or the UE) as described here are assumed to interface with each other and with the existing functional blocks (not described here) of the communication device 402 in compliance with the existing standards.

What is claimed is:

1. A method for generating Radio Link Control (RLC) Packet Data Units (PDUs) for a future Transmission Time Interval (TTI) by a User Equipment (UE), comprising the steps of:

adapting a size of the RLC PDUs for the future TTI, wherein the UE is in a current TTI;

detecting a value for maximum variation in a scheduled grant for the UE;

determining a factor using the detected value for the maximum variation;

determining a maximum value of number of bytes using the factor and the size of the RLC PDUs adapted for the future TTI; and generating the RLC PDUs for the future TTI using the maximum value.

2. A communication device comprising:

a storing means for storing a plurality of Media Access Control (MAC)-d flows, wherein the MAC-d flows are stored in a plurality of lists based on type of grants associated with the MAC-d flows and availability of MAC-d PDU in the MAC-d flows in a current Transmission Time Interval (TTI);

a processing unit for selecting an Enhanced Transport Format Combination (E-TFC) for a future TTI when a User Equipment (UE) is in the current TTI using a value of power offset associated with a MAC-d flow from the plurality of stored MAC-d flows and adapting an RLC PDU size for the future TTI using the selected E-TFC;

a processing unit for generating the RLC PDUs for the future TTI using a factor, based on maximum variation in grant for the future TTI for the communication device, and the RLC PDU size adapted for the future TTI.

3. The communication device of claim 2, wherein the communication device is a UE in a telecommunication system.

4. A method for generating, by a User Equipment (UE), Radio Link Control (RLC) Packet Data Units (PDUs) for a later Transmission Time Interval (TTI), the method comprising the steps of:

determining that a size of the RLC PDUs for the later TTI is flexible;

determining, by the UE, the size of the RLC PDUs for the later TTI based on an amount of data allowed in a current TTI; and generating, by the UE, the RLC PDUs for the later TTI using the determined size.

5. The method of claim 4, wherein the UE determines the size of the RLC PDUs for the later TTI further based on a maximum amount of data allowed in a grant for the later TTI.

6. A User Equipment (UE) comprising:

a memory for storing a plurality of Radio Link Control (RLC) Packet Data Units (PDUs); and a processing unit for determining a size of the RLC PDUs for a later Transmission Time Interval (TTI) based on an amount of data allowed in a current TTI, if the size of the RLC PDUs for the later TTI is flexible, and for generating the RLC PDUs for the later TTI using the determined size.

7. The UE of claim 6, wherein the processing unit further uses a maximum amount of data allowed in a grant for the later TTI to determine the size of the RLC PDUs for the later TTI.

* * * * *